2,953,594

PREPARATION OF NITRILES BY CATALYZED REACTION OF CYANOGEN AND KETONES

William L. Fierce, Crystal Lake, and Walter J. Sandner, Carpentersville, Ill., assignors to The Pure Oil Company, Chicago, Ill., a corporation of Ohio No Drawing. Filed Dec. 23, 1957, Ser. No. 704,293

15 Claims. (Cl. 260—465)

This invention relates to new and useful improvements in methods for preparing organic nitriles and more particularly to a method for preparing aliphatic and aromatic nitriles by reaction of cyanogen and ketones at elevated temperatures in the presence of a high-surface-area refractory catalyst.

It is therefore one object of this invention to provide an improved method for preparing aliphatic and aromatic nitriles.

Another object of this invention is to provide a method of preparing a variety of aliphatic and aromatic nitriles from ketones in high yield.

A feature of this invention is the provision of a process for preparing aliphatic and aromatic nitriles by the catalyzed reaction of cyanogen and a ketone.

Another feature of this invention is the provision of a process for preparing aliphatic and aromatic nitriles, such as acetonitrile, propionitrile, benzonitrile, and the like, by the high temperature reaction of cyanogen and lower alkyl or aryl ketones, in the presence of a high-surface-area refractory catalyst, at a temperature above about 340° C.

Other objects and features of this invention will become apparent from time to time throughout the specification and claims as hereinafter related.

In our co-pending application, Serial No. 658,976, filed May 14, 1957, now U.S. Patent 2,864,851, there is described a process in which a ketone and cyanogen are reacted at a temperature in the range from 500°–1000° C. Within this range of temperature aliphatic and aromatic ketones decompose readily to produce free radicals and carbon monoxide, with the free radicals reacting with cyanogen to produce aliphatic and aromatic nitriles as the principal reaction products. This reaction apparently proceeds as follows:

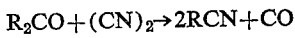

For unsymmetrical ketones the reaction products are mixed, according to the free radicals liberated on decomposition of the ketone:

This reaction proceeds well with any ketone which may be decomposed readily but is easier to carry out using ketones which are sufficiently volatile to permit their being fed to the reaction zone in the gaseous state. This reaction proceeds well with any of the lower aliphatic, aromatic, and mixed ketones as a reactant, e.g., acetone, methylethyl ketone, diethyl ketone, dipropyl ketone, dibutyl ketone, methylpropyl ketone, diamyl ketone, benzophenone, acetophenone, ethyl phenyl ketone, ethyl tolyl ketone, ditolyl ketone, di-1-naphthyl ketone, dibenzyl ketone, and benzyl phenyl ketone.

This invention is based upon our discovery that the reaction of ketones and cyanogen, as described above, may be carried out at substantially lower temperatures, e.g., as low as 340° C., in the presence of a high-surface-area refractory catalyst. Catalysts which may be used in this process to effect reaction at lower temperatures include such high-surface-area refractory catalysts as activated charcoal, activated alumina, silica, silica-alumina, silica-zirconia, silica-alumina-zirconia, silica-titania, silica-alumina-titania, silica-beryllia, and silica-alumina-beryllia. When the reaction of ketones with cyanogen is carried out in the presence of any of these catalysts, the minimum temperature for effecting reaction is lowered from 500° C. to about 340° C. and the yield of nitriles at temperatures above 340° C. is markedly increased over the yields obtained in the absence of a catalyst.

This reaction proceeds well at atmospheric pressure, although it may be carried out at either sub-atmospheric or super-atmospheric pressures. In carrying out this reaction the preferred mol ratio of ketone to cyanogen is in the range from 1:6 to 6:1. The lower ratios of ketone to cyanogen have been found to result in lower yields of nitriles per pass through the reaction zone. On the other hand, high proportions of ketones produce higher yields per pass but result in losses through side reactions of the free radicals liberated on decomposition of the ketones. While the aforementioned range of proportions is somewhat preferred, the mol ratio of ketones to cyanogen may vary widely, as for example, from 1:20 to 20:1 and still produce organic nitriles as a principal reaction product. The reaction gases may be passed through the reaction zone at a gaseous hourly space velocity of approximately 50 to 2,000, with a space velocity of 150 to 500 being preferred. In this process the term "space velocity" refers to the ratio of the volume of reactant gases, at standard temperature and pressure, charged per hour, to the volume of the reactant space.

The preferred method of carrying out this process is to mix the ketone to be reacted with cyanogen in the gaseous state, and pass the mixture through a heated reaction zone containing the catalyst. When relatively non-volatile (i.e., high-boiling-point) ketones are to be reacted, the ketones are fed as liquids directly to the reactor and vaporized directly into the reaction zone. Any type of reaction zone may be used which is resistant to attack by the reactants or reaction products. Quartz, high-silica glass, stainless steel, or other refractory and corrosion-resistant materials may be used. The reaction zone may be heated by any suitable means, such as combustion gases applied externally to the reactor, external or internal electrical heaters, including resistance heaters and induction heaters, heating tubes extending through the reactor, or hot refractory pebbles in the reactor.

The product gases from the reaction zone consist of a mixture of aliphatic and/or aromatic nitriles, unreacted cyanogen and ketones, carbon monoxide, and ketone decomposition products. These reaction gases are withdrawn from the reaction zone and cooled to a temperature sufficiently low to condense the nitriles and other condensable by-products, so that the unreacted cyanogen and ketones may be recycled to the reaction zone. The liquid which is condensed from the reaction gases will ordinarily have to be fractionated to obtain pure nitriles, and may have to be fractionated for efficient recycle of the cyanogen and ketones.

A number of experiments were carried out in which acetone and cyanogen were reacted at elevated temperatures, in the absence of a catalyst, under a number of different conditions of temperature, mol ratio of reactants, and space velocity of reactant gases. In these experiments, helium was bubbled through liquid acetone at room temperature and the resulting stream of helium plus acetone vapor was then mixed with cyanogen and passed through an empty, electrically-heated tube of Vycor high-silica glass. The gas mixture charged to the reactor tube and the product gases were analyzed by a mass spectrometer to determine the composition of charge gas and the product gases. The experimental conditions and results are set forth in Table I.

Table I

|  | Run No. | | |
|---|---|---|---|
|  | 70 | 82 | 83 |
| Temperature (° C.) | 428 | 565 | 663 |
| Mole ratio of $CH_3COCH_3/(CN)_2$ | 0.61 | 1.76 | 1.83 |
| Gaseous hourly space velocity of charge gas | 130 | 191 | 191 |
| Percent conversion of $(CN)_2$ | 0.0 | 11.5 | 16.4 |
| Percent conversion of $CH_3COCH_3$ | 8.8 | 5.5 | 27.3 |
| Acetonitrile-molar yield per pass | 0.0 | 0.9 | 7.3 |
| Acetonitrile-selectivity | 0.0 | 7.7 | 44.4 |

The yield per pass is defined as the moles of the indicated product formed, expressed as a percent of the moles of cyanogen charged. The selectivity is a similar percentage based upon the moles of cyanogen consumed in the reaction.

In another series of runs this process was carried out in the presence of activated alumina as a catalyst for the reaction of cyanogen with acetone. The procedure used was substantially the same as that used in the runs described above. In these runs helium was bubbled through liquid acetone at room temperature, and the resulting stream of helium plus acetone vapor was blended with cyanogen. The gaseous mixture was then passed through an electrically heated tube of Vycor high-silica glass containing the activated alumina catalyst. The gas mixture charged to the reactor tube and the product gases were analyzed by a mass spectrometer to determine the composition of the charge gas and the product gases. The experimental conditions and results are set forth in Table II.

Table II

|  | Run No. | | |
|---|---|---|---|
|  | 24 | 73 | 25 |
| Temperature (° C.) | 340 | 457 | 520 |
| Mole ratio of $CH_3COCH_3/(CN)_2$ | 2.48 | 2.13 | 2.76 |
| Gaseous hourly space velocity of charge gas | 378 | 372 | 402 |
| Percent conversion of $(CN)_2$ | 100.0 | 100.0 | 100.0 |
| Percent conversion of $CH_3COCH_3$ | 77.8 | 100.0 | 96.5 |
| Acetonitrile-molar yield per pass | 2.8 | 65.2 | 49 |
| Acetonitrile-selectivity | 2.8 | 65.2 | 49 |

The analysis for acetonitrile in run 73 is believed to be slightly high but is significant in that it indicates a very substantial yield of acetonitrile under the conditions of the run. Other experimental data indicate that the yield of acetonitrile in this reaction continues to increase with temperature and reaches a maximum at about 650° C.

Other runs were carried out which demonstrate the type of catalyst which can be used in this process. In these runs the same apparatus and procedure were used as in the preceding runs except that sicila gel was substituted for the activated alumina catalyst. The experimental conditions and results are set forth in Table III.

Table III

|  | Run No. | |
|---|---|---|
|  | 76 | 77 |
| Temperature (° C.) | 330 | 513 |
| Mole ratio of $CH_3COCH_3/(CN)_2$ | 348 | 370 |
| Gaseous hourly space velocity of charge gas | 2.84 | 3.43 |
| Percent conversion of $(CN)_2$ | 99.3 | 97.1 |
| Percent conversion of $CH_3COCH_3$ | 69.3 | 78.1 |
| Acetonitrile-molar yield per pass | 0 | 23.1 |
| Acetonitrile-selectivity | 0 | 23.8 |

The yields obtained in these two runs were not as good as in the runs with the activated alumina catalyst but were substantially better than those from the uncatalyzed reactions set forth in Table I. When the silica gel catalyst is used, a small yield of acetonitrile is first obtained at about 350° C. and the yield continues to increase to a maximum at about 650° C.

In another series of runs this process was carried out using diethyl ketone and cyanogen as reactants, and activated alumina as catalyst. In these experiments helium was bubbled through liquid diethyl ketone at room temperature, and the resulting stream of helium plus diethyl ketone vapor was blended with cyanogen and passed through an electrically heated tube of Vycor high-silica glass containing activated alumina catalyst. The gas mixture charged to the reactor tube and the product gases were analyzed by a mass spectrometer to determine the composition of the charge gas and the product gases. Experimental conditions and results are set forth in Table IV.

Table IV

|  | Run No. | |
|---|---|---|
|  | 80 | 81 |
| Temperature (° C.) | 433 | 550 |
| Mole ratio of $(C_2H_5)_2CO/(CN)_2$ | 0.144 | 0.150 |
| Gaseous hourly space velocity of charge gas | 377 | 376 |
| Percent conversion of $CN_2$ | 100 | 100 |
| Percent conversion of $(C_2H_5)_2CO$ | 100 | 100 |
| Acetonitrile-molar yield per pass | 16.2 | 65.0 |
| Acetonitrile-selectivity | 16.2 | 65.0 |
| Propionitrile-molar yield per pass | 70.3 | 16.2 |
| Propionitrile-selectivity | 70.3 | 16.2 |

The yield per pass is defined as the moles of the indicated product formed, expressed as a percent of the moles of the limiting reactant (diethyl ketone) charged. The selectivity is a similar percentage based upon the moles of diethyl ketone consumed. The type of product obtained by the catalyzed reaction of diethyl ketone and cyanogen varies somewhat with temperature. At temperatures of 400°–475° C., the major product is propionitrile while at 525°–600° C. the major product is acetonitrile. At temperatures above 600° C. one of the major products is acrylonitrile.

This process works well with other aliphatic and aromatic ketones. When the ketone has an appreciable vapor pressure at room temperature it may be vaporized in the same manner as with acetone and diethyl ketone into a stream of helium. The higher-boiling aliphatic and aromatic ketones are metered as liquids to the reaction zone. In our co-pending application, Serial No. 658,976, now U.S. Patent 2,864,851, filed May 14, 1957, a procedure is described for reacting a diaryl ketone, such as benzophenone, or a mixed alkyl-aryl ketone, such as acetophenone with cyanogen at temperatures of the order of 550°–800° C. When reactions of this type are carried out using activated alumina, silica, or any of the other high-surface, refractory catalysts described herein, the minimum temperature for carrying out the reaction is substantially decreased and the yields of nitriles at higher temperatures is substantially increased.

From our experiments, we have found that nitriles are formed when ketones, either symmetrical or unsymmetrical, aliphatic, aromatic, or mixed, are heated to a temperature in the range from about 340° to 1000° C. in the presence of cyanogen and a high-surface-area, refractory catalyst. The yield and character of the reaction products vary somewhat with the temperature of the reaction and may require some experimentation to determine the optimum conditions for producing a given product. Thus the optimum conditions for producing acetonitrile from acetone and cyanogen are somewhat different from the optimum conditions for production of propionitrile from diethyl ketone and cyanogen.

In general, the use of an excess of cyanogen produces nitriles, formed from the alkyl or aryl radicals liberated upon decomposition of the ketone, as a major product. When excess of the ketone is used, other nitriles are formed which result from the reaction of cyanogen with decomposition and polymerization products of the ketone. As was previously pointed out, this reaction proceeds with any of a variety of ketones, both symmetrical and unsymmetrical, although symmetrical ketones are preferred since product recovery is simpler.

While this process has been described with considerable emphasis upon reactions of cyanogen with lower alkyl and aryl ketones, the process is operative with long-chain and branch-chain aliphatic ketones and substituted aryl ketones. The use of long-chain and branch-chain ketones and substituted aryl ketones in this process utilizes the same techniques as when the lower ketones are used except that the ketones are fed as liquids to the reactor, and a closer control of temperature is required to prevent the formation of an exceptionally large amount of undesirable by-products. Long-chain and branched chain alkyl groups which are liberated in the decomposition of higher-molecular weight ketones may decompose into a variety of hydrocarbon fragments which result in a variety of by-products. However, the temperature at which the linkage between the alkyl groups and the carbonyl radical is broken is lower than the temperature at which the alkyl group is cracked, and so if the reaction is carried out in the temperature range just above the thermal decomposition point of the ketone, it is possible to produce higher alkyl nitriles without production of an excessive amount of by-products. With diaryl ketones, e.g., phenyl and naphthyl, there is less danger of decomposition of the free radicals due to the high stability of the aromatic nucleus. In this process the use of the high-surface-area refractory catalysts permits the carrying out of the reaction at a lower temperature and thus produces higher yields of the principal reaction products and lesser amount of undesirable by-products and decomposition products.

Having thus described our invention as required by the patent statutes, we wish it to be understood that within the scope of the appended claims this invention may be practiced otherwise than as specifically described.

What is claimed is:

1. A method of preparing organic nitriles of the formula RCN, where R is a hydrocarbon radical, which comprises reacting cyanogen and a ketone of the formula RCOR', where R and R' are hydrocarbon radicals from which the nitrile is derived, at a temperature of 340°–1000° C. in the presence of a high-surface-area refractory catalyst.

2. A method according to claim 1 in which said catalyst is of the group consisting of activated charcoal, activated alumina, alumina, silica, silica-alumina, silica-zirconia, silica-alumina-zirconia, silica-titania, silica-alumina-titania, silica-beryllia, and silica-alumina-beryllia.

3. A method according to claim 2 in which the mol ratio of the ketone to cyanogen is in the range from 1:20 to 20:1 and the hourly space velocity of charge gases is from 50 to 2000.

4. A method according to claim 2 in which the ketone is a symmetrical ketone.

5. A method according to claim 2 in which the ketone is an unsymmetrical ketone.

6. A method according to claim 2 in which the ketone is an aliphatic ketone.

7. A method according to claim 2 in which the ketone is an aromatic ketone.

8. A method according to claim 2 in which the ketone is a mixed aromatic-aliphatic ketone.

9. A method of preparing lower aliphatic hydrocarbyl nitriles which comprises reacting cyanogen with acetone at a temperature of 340°–1000° C. in the presence of an activated alumina catalyst.

10. A method of preparing lower aliphatic hydrocarbyl nitriles which comprises reacting cyanogen with acetone at a temperature of 340°–1000° C. in the presence of a silica gel catalyst.

11. A method of preparing lower aliphatic hydrocarbyl nitriles which comprises reacting acetone with cyanogen in a mol ratio of 1:6 to 6:1, an hourly space velocity of charge gas of 150–500, and temperature of 400°–650° C. in the presence of an activated alumina catalyst, and recovering acetonitrile as the principal reaction product.

12. A method of preparing lower aliphatic hydrocarbyl nitriles which comprises reacting acetone with cyanogen in a mol ratio of 1:6 to 6:1, an hourly space velocity of charge gas of 150–500, and temperature of 400°–650° C. in the presence of a silica gel catalyst, and recovering acetonitrile as the principal reaction product.

13. A method of preparing lower aliphatic hydrocarbyl nitriles which comprises reacting diethyl ketone with cyanogen in a mol ratio of 1:6 to 6:1, an hourly space velocity of charge gas of 150–500, and temperature of 400°–650° C. in the presence of an activated alumina catalyst.

14. A method according to claim 13 in which the reaction temperature is 400°–475° C. and the principal reaction product recovered is propionitrile.

15. A method according to claim 13 in which the reaction temperature is 525°–600° C. and the principal reaction product recovered is acetonitrile.

References Cited in the file of this patent

UNITED STATES PATENTS 2,500,256    Mohan _____ Mar. 14, 1950

OTHER REFERENCES

Migrdichian: "The Chemistry of Organic Cyanogen Compounds," 1947, page 287.